//  
United States Patent Office 3,294,767  
Patented Dec. 27, 1966

---

3,294,767
THERMALLY STABLE VINYL FLUORIDE POLYMERS
Robert D. Lundberg, St. Albans, and Frederick E. Bailey, Jr., Charleston, W. Va., assignors to Union Carbide Corporation, a corporation of New York
No Drawing. Filed June 25, 1963, Ser. No. 290,330
12 Claims. (Cl. 260—80.5)

This invention relates generally to vinyl fluoride polymers having improved thermal stability over poly(vinyl fluoride). In a more particular aspect this invention relates to copolymers of vinyl fluoride and bicyclo[2.2.1]hept-2-ene or its derivatives which are characterized by improved melt processability and thermal stability. In another aspect this invention relates to vinyl fluoride copolymers with bicyclo[2.2.1]hept-2-ene carboxamides or other amides which are characterized by a very high degree of thermal stability.

Poly(vinyl fluoride) is known to possess excellent physical properties, particularly toughness, flexibility and good resistance to weathering and ultra-violet radiation. However, poly(vinyl fluoride), like poly(vinyl chloride), is subject to thermal degradation, decomposing at temperatures about its melting point (about 195° C. to 200° C.) to form hydrogen fluoride, which is extremely corrosive and toxic. Thus, poly(vinyl fluoride), as well as many vinyl fluoride copolymers, is not amenable to melt fabrication techniques, such as calendering or extrusion. Although films of poly(vinyl fluoride) can be cast by the use of the organosol technique wherein poly(vinyl fluoride) is admixed with an organic liquid which causes the polymer to swell and form a fluid mixture, this method has several disadvantages. For example, the use of the organic liquid increases the cost of producing articles of poly(vinyl fluoride). In addition, the evaporation of the organic liquid often results in a non-continuous polymer film and a bake is often necessary to permit the poly(vinyl fluoride) particles to coalesce and form a continuous film. Here again, the problem of thermal decomposition arises. In addition, this method is unsuitable for producing articles of substantial thickness.

A certain degree of thermal stabilization of poly(vinyl fluoride) has been achieved in the past by admixing the poly(vinyl fluoride) with an amine, such as dicyclohexylamine, by solvent techniques or by milling. However, these methods of stabilization have not been entirely satisfactory. For example, the use of solvent techniques, wherein poly(vinyl fluoride) is suspended in a solution of stabilizer in an organic liquid, is unsatisfactory because the stabilizer is merely adsorbed on the surface of the polymer and is not uniformly dispersed throughout. Although more uniform mixtures are obtained by milling, the product is still only a physical mixture of stabilizer and polymer and, because many of the stabilizers are incompatible with poly(vinyl fluoride), the product is often cloudy and weaker than the unstabilized poly(vinyl fluoride). In addition, because many of the stabilizers are liquids, they readily evaporate at processing temperatures, permitting thermal degradation.

Thus, until the instant invention, there has been no method for stabilizing vinyl fluoride polymers which provides a uniform dispersion of the stabilizer in the polymers; a high degree of stabilization of the polymer at elevated temperatures; and which has little or no detrimental effect on the physical properties of the vinyl fluoride polymer.

It has now been discovered that when vinyl fluoride is copolymerized with bicyclo[2.2.1]hept-2-ene there is obtained a copolymer which has improved thermal stability as well as a reduced melting point, and melt viscosity thus permitting the melt processing of a vinyl fluoride polymer without undue danger of thermal decomposition. In addition these copolymers retain the excellent toughness, flexibility and resistance to ultraviolet light characteristic of poly(vinyl fluoride). For example, a vinyl fluoride/bicyclo[2.2.1]hept-2-ene copolymer containing about 13 weight percent (6.8 mole percent) polymerized bicyclo[2.2.1]hept-2-ene can be molded at about 220° C. to 230° C. for about 1 minute, with little or no discoloration, to form a clear, tough plaque. In addition, this copolymer can be exposed to ultraviolet light for over 710 hours at 50° C. with only a slight yellowing.

The amount of bicyclo[2.2.1]hept-2-ene compound which is required to achieve the improved thermal stability and reduced melting point can vary from about 0.5 mole percent to about 45 mole percent, with melting point decreasing with increasing amounts of the bicyclo[2.2.1]hept-2-ene. Bicyclo[2.2.1]hept-2-ene concentrations of at least about 5 mole percent are preferred, however, because of the superior stability of these copolymers at their processing temperatures. As the amount of bicyclo[2.2.1]hept-2-ene increases beyond about 15 mole percent, the melting point of the copolymer is reduced to less than about 140° C., and the polymer is no longer suitable for use in these applications at which elevated temperatures are prevalent. Polymers having a bicyclo[2.2.1]hept-2-ene content in excess of about 45 weight percent are too brittle for most applications.

It has been further discovered that, if vinyl fluoride is copolymerized with a monomer containing an N-unsubstituted carboxamide group, a polymer having greatly improved thermal stability over poly(vinyl fluoride) or a vinyl fluoride/bicyclo[2.2.1]hept-2-ene copolymer is obtained. For example a vinyl fluoride/bicyclo[2.2.1]hept-2-ene/bicyclo[2.2.1]hept-2-en-5-yl carboxamide terpolymer containing about 2.8 weight percent (1 mole percent) bicyclo[2.2.1]hept-2-en-5-yl carboxamide and 3.7 weight percent (about 2 mole percent) bicyclo[2.2.1]hept-2-ene, can be heated up to 275° C. for up to 1 minute with no yellowing.

It is believed that the improved processability and thermal stability obtained by the copolymerization of vinyl fluoride with bicyclo[2.2.1]hept-2-ene or its derivatives is due to the presence of the 2,3-bicyclo[2.2.1]heptanylene nucleus:

in the polymer chains. The bulky nature of this group disrupts the crystalline structure present in poly(vinyl fluoride), thus causing a reduction in melting point. In addition, the presence of this group inhibits the "unzipping" of the polymerized vinyl fluoride, thus providing a certain degree of thermal stability.

Because the reduction in melting point and improved stability are due to the bicycloheptanylene group, one can employ substitute derivatives of bicyclo[2.2.1]hept-2-ene in producing the copolymers of this invention, provided there is no substitution on the 2- and 3-carbon atoms forming the double bond, and the substituent is not readily polymerized by free-radical techniques. Accordingly, alkenyl or alkynyl groups cannot be present. However, olefinic double bonds in a bicycloheptenyl structure can be present in the substituent.

In general, the suitable bicycloheptenes can be represented by the formula:

(I) 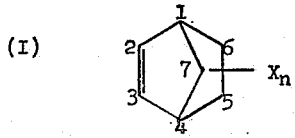

wherein n is an integer having a value of from 0 to 6 and X is a substituent on the 1,4,5,6 or 7 positions of the bicycloheptene nucleus, said bicycloheptene having a molecular weight of less than 400. Each X can be a monovalent substituent such as a monovalent hydrocarbyl substituent free from aliphatic unsaturation (i.e., ethylenic or acetylenic unsaturation) including alkyl groups such as methyl, ethyl, isopropyl, n-propyl, tert.-butyl, hexyl, decyl and the like; an aromatic substituent such as phenyl, naphthyl and the like; an alkaryl substituent such as tolyl, xylyl, mesityl and the like; and aralkyl substituent such as benzyl, phenethyl and the like; a cycloaliphatic substituent including cycloalkyl groups such as cyclobutyl, cyclopentyl, methylcyclopentyl, dimethylcyclopentyl, ethylcyclopentyl, cyclohexyl, methylcyclohexyl, cycloheptyl and the like, and bicyclopentenyl groups; a halogen atom such as fluorine, chlorine, bromine, iodine, and halogen-substituted hydrocarbyl groups; the hydroxyl group and hydroxyl-substituted hydrocarbyl groups; the cyano group and cyano-substituted hydrocarbyl groups; the isocyanato group and isocyanato-substituted hydrocarbyl groups; the amino, N-substituted amino and N,N-disubstituted amino groups and the aminohydrocarbyl groups; the carboxamido, N-substituted carboxamido and N,N-disubstituted carboxamido groups and the carboxamidohydrocarbyl, N-substituted carboxamidohydrocarbyl and N,N-disubstituted carboxamidohydrocarbyl groups; the carboxyl and carboxyhydrocarbyl groups; hydrocarbylcarbonyloxy groups such as acetoxy, propionoxy, benzoyloxy and the like and hydrocarbylcarbonyloxyhydrocarbyl groups; halocarbonyl and halocarbonylhydrocarbyl groups; mercapto and hydrocarbylmercapto groups and mercaptohydrocarbyl and hydrocarbylmercaptohydrocarbyl groups; hydrocarbylsulfoxy groups and hydrocarbylsulfoxyhydrocarbyl groups; hydrocarbyl sulfonyl and hydrocarbylsulfonylhydrocarbyl groups; hydrocarbyloxy and hydrocarbyloxyhydrocarbyloxy groups; epoxyhydrocarbyloxy and epoxyhydrocarbyloxyhydrocarbyl groups; et cetera. In addition to such monovalent substituents the bicycloheptene nucleus can be substituted in the 5- and 6-positions with divalent substituents such as an anhydride group a dicarboximido group $$(-\overset{O}{\overset{\|}{C}}O\overset{O}{\overset{\|}{C}}-)$$

$$(-\overset{O}{\overset{\|}{C}}NH\overset{O}{\overset{\|}{C}}-)$$

or N-substituted dicarboximido group; an alkylene group such as trimethylene and the like; a cycloalkylene group such as 1,3-cyclopentanylene, and the like; a cycloalkenylene group such as 1,3-cyclopentenylene and the like; et cetera.

These compounds can be more specifically represented by the formulae:

(II) 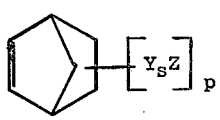

and (III) 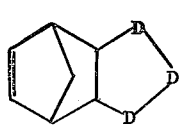

wherein Y is a divalent hydrocarbon group having no aliphatic unsaturation other than cycloaliphatic unsaturation, one bond of which is bonded to the bicycloheptene nucleus in the 1,4,5,6 or 7 position, the other of which is bonded to a monovalent Z group; p is an integer having a value of 0 to 6; s is an integer having a value of 0 or 1; and Z is (a) a hydrogen atom, (b) a halogen atom (chlorine, bromine, fluorine, and iodine), (c) an —OR group, (d) a cyano group, (e) an isocyanato group, (f) an —OOCR¹ group, (g) an —NR₂ group, (h) a —CONR₂ group, (i) a —COOR group, (j) a —COR² group, (k) an acetal group [—CH(OR³)₂], (l) an

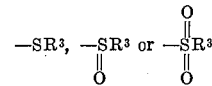

group, (m) an

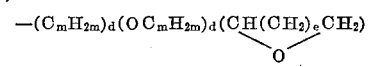

group, or (n) an

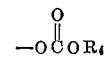

group; and each D represents carbon, oxygen, nitrogen, or sulfur and at least one of said D variables must be a carbon atom. Among some of the divalent units represented by the divalent

unit making up the cyclic ring one can mention the following:

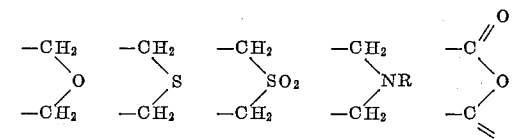

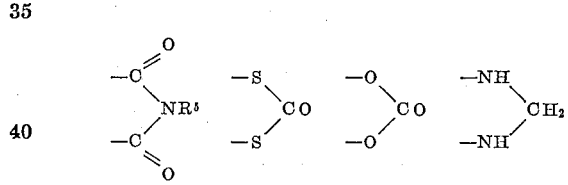

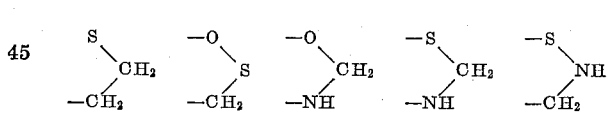

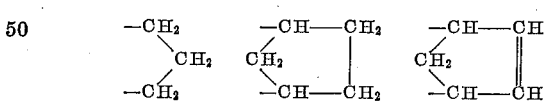

and so forth, wherein R is a hydrogen atom, an alkyl group containing from 1 to 18 carbon atoms or a cycloalkyl group containing from 4 to 7 ring atoms; R¹ is an alkyl group containing from 1 to 18 carbon atoms or a halogen atom; R² is a halogen atom or an alkyl group containing from 1 to 10 carbon atoms; R³ is an alkyl group of from 1 to 10 carbon atoms; R⁴ is an alkyl group of from 1 to 10 carbon atoms or phenyl; R⁵ is a —C$_m$H$_{2m}$T group; T is a hydrogen atom, a halogen atom, an —OR group, a cyano group or an —NR₂ group; m is an integer having a value of from 1 to 4; d is an integer having a value of from 0 to 1; and e is an integer having a value of from 0 to 2.

The preferred class of bicyclo[2.2.1]hept-2-ene compounds are those on the formula:

(IV) 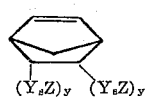

wherein Y and Z and s are defined above and each y is an integer having a value of from 0 to 2 inclusive.

Illustrative of the suitable bicyclo[2.2.1]hept-2-enes, one can mention:

bicyclo[2.2.1]hept-2-ene,
5-methylbicyclo[2.2.1]hept-2-ene,
5-ethylbicyclo[2.2.1]hept-2-ene,
5-isopropylbicyclo[2.2.1]hept-2-ene,
5-pentylbicyclo[2.2.1]hept-2-ene,
5-hexylbicyclo[2.2.1]hept-2-ene,
5-heptylbicyclo[2.2.1]hept-2-ene,
5-(2-ethylhexyl)bicyclo[2.2.1]hept-2-ene,
5-nonylbicyclo[2.2.1]hept-2-ene,
5-dodecylbicyclo[2.2.1]hept-2-ene,
5-pentadecylbicyclo[2.2.1]hept-2-ene,
5,6-dimethylbicyclo[2.2.1]hept-2-ene,
5,5-dimethylbicyclo[2.2.1]hept-2-ene,
5,5-diisopropylbicyclo[2.2.1]hept-2-ene,
5,5-dibutylbicyclo[2.2.1]hept-2-ene,
5,5-dihexylbicyclo[2.2.1]hept-2-ene,
5-methyl-5-ethylbicyclo[2.2.1]hept-2-ene,
5,5-didecylbicyclo[2.2.1]hept-2-ene,
5-methyl-6-ethylbicyclo[2.2.1]hept-2-ene,
5,6-dipropylbicyclo[2.2.1]hept-2-ene,
5,6-diisopropylbicyclo[2.2.1]hept-2-ene,
5,6-dipentylbicyclo[2.2.1]hept-2-ene,
5,6-di(2-ethylhexyl)bicyclo[2.2.1]hept-2-ene,
5,6-didodecylbicyclo[2.2.1]hept-2-ene,
5,5,6-trimethylbicyclo[2.2.1]hept-2-ene,
5,5,6-tripropylbicyclo[2.2.1]hept-2-ene,
5,5-dimethyl-6-ethylbicyclo[2.2.1]hept-2-ene,
5,5,6,6-tetramethylbicyclo[2.2.1]hept-2-ene,
5,5,6,6-tetraisopropylbicyclo[2.2.1]hept-2-ene,
5,5-dimethyl-6,6-diethylbicyclo[2.2.1]hept-2-ene,
5-phenylbicyclo[2.2.1]hept-2-ene,
5-napthylbicyclo[2.2.1]hept-2-ene,
5,5-diphenylbicyclo[2.2.1]hept-2-ene,
5,6-diphenylbicyclo[2.2.1]hept-2-ene,
5,5,6-triphenylbicyclo[2.2.1]hept-2-ene,
5-benzylbicyclo[2.2.1]hept-2-ene,
5-phenethylbicyclo[2.2.1]hept-2-ene,
5,6-dibenzylbicyclo[2.2.1]hept-2-ene,
5-α-mesitylbicyclo[2.2.1]hept-2-ene,
5-naphthylbicyclo[2.2.1]hept-2-ene,
5-tolylbicyclo[2.2.1]hept-2-ene,
5,6-ditolylbicyclo[2.2.1]hept-2-ene,
5-xylylbicyclo[2.2.1]hept-2-ene,
5-methylnaphthylbicyclo[2.2.1]hept-2-ene,
5-cyclobutylbicyclo[2.2.1]hept-2-ene,
5,6-dicyclopentylbicyclo[2.2.1]hept-2-ene,
5-methylcyclopentylbicyclo[2.2.1]hept-2-ene,
5-isopropylcyclopentylbicyclo[2.2.1]hept-2-ene,
5-cyclohexylbicyclo[2.2.1]hept-2-ene,
5-chlorobicyclo[2.2.1]hept-2-ene,
5-bromobicyclo[2.2.1]hept-2-ene,
5-iodobicyclo[2.2.1]hept-2-ene,
5-fluorobicyclo[2.2.1]hept-2-ene,
5-hydroxybicyclo[2.2.1]hept-2-ene,
5-cyanobicyclo[2.2.1]hept-2-ene,
5-aminobicyclo[2.2.1]hept-2-ene,
5-N-methylaminobicyclo[2.2.1]hept-2-ene,
bicyclo[2.2.1]hept-2-en-5-yl acetate,
bicyclo[2.2.1]hept-2-en-5-yl propionate,
bicyclo[2.2.1]hept-2-en-5-yl pentanoate,
5-isocyanatobicyclo[2.2.1]hept-2-ene,
5-carboxybicyclo[2.2.1]hept-2-ene,
ethyl bicyclo[2.2.1]hept-2-ene-5-carboxylate,
butyl bicyclo[2.2.1]hept-2-ene-5-carboxylate,
bicyclo[2.2.1]hept-2-ene-5-carboxamide,
N-methylbicyclo[2.2.1]hept-2-ene-5-carboxamide,
N,N-dimethylbicyclo[2.2.1]hept-2-ene-5-carboxamide,
N-propylbicyclo[2.2.1]hept-2-ene-5-carboxamide,
N,N-dibutylbicyclo[2.2.1]hept-2-ene-5-carboxamide,
5-epoxyethylbicyclo[2.2.1]hept-2-ene,
5-chloromethylbicyclo[2.2.1]hept-2-ene,
5-bromopropylbicyclo[2.2.1]hept-2-ene,
5-chlorodecylbicyclo[2.2.1]hept-2-ene,
5-hydroxymethylbicyclo[2.2.1]hept-2-ene,
5-hydroxybutylbicyclo[2.2.1]hept-2-ene,
5-cyanoethylbicyclo[2.2.1]hept-2-ene,
5-cyanopentylbicyclo[2.2.1]hept-2-ene,
5-isocyanatobutylbicyclo[2.2.1]hept-2-ene,
5-aminomethylbicyclo[2.2.1]hept-2-ene,
5-aminoheptylbicyclo[2.2.1]hept-2-ene,
5-N-methylaminomethylbicyclo[2.2.1]hept-2-ene,
5-N,N-dimethylaminoethylbicyclo[2.2.1]hept-2-ene,
5-N,N-dipropylaminobutylbicyclo[2.2.1]hept-2-ene,
bicyclo[2.2.1]hept-2-en-5-ylmethyl acetate,
bicyclo[2.2.1]hept-2-en-5-yl-n-butyl acetate,
bicyclo[2.2.1]hept-2-en-5-yldecyl acetate,
bicyclo[2.2.1]hept-2-en-5-ylmethyl butyrate,
bicyclo[2.2.1]hept-2-en-5-ylmethyl chloroformate,
bicyclo[2.2.1]hept-2-en-5-ylmethyl bromoformate,
bicyclo[2.2.1]hept-2-en-5-ylmethyl carbamate,
bicyclo[2.2.1]hept-2-en-5-ylpropyl carbamate,
bicyclo[2.2.1]hept-2-en-5-ylmethylcarboxamide,
bicyclo[2.2.1]hept-2-en-5-ylethylcarboxamide,
bicyclo[2.2.1]hept-2-en-5-ylbutylcarboxamide,
N-methylbicyclo[2.2.1]hept-2-en-5-ylmethylcarboxamide,
N,N-dimethylbicyclo[2.2.1]hept-2-en-5-ylmethylcarboxamide,
N-propylbicyclo[2.2.1]hept-2-en-5-ylmethylcarboxamide,
N-methylbicyclo[2.2.1]hept-2-en-5-ylpropylcarboxamide,
N,N-dimethylbicyclo[2.2.1]hept-2-en-5-ylethylcarboxamide,
bicyclo[2.2.1]hept-2-en-5-ylacetic acid,
2-(bicyclo[2.2.1]hept-2-en-5-yl)propionic acid,
4-(bicyclo[2.2.1]hept-2-en-5-yl)butyric acid,
6-(bicyclo[2.2.1]hept-2-en-5-yl)-2-ethylhexanoic acid,
8-(bicyclo[2.2.1]hept-2-en-5-yl)octanoic acid,
9-(bicyclo[2.2.1]hept-2-en-5-yl)nonanoic acid,
12-(bicyclo[2.2.1]hept-2-en-5-yl)dodecanoic acid,
methyl bicyclo[2.2.1]hept-2-en-5-ylacetate,
isopropyl 3-(bicyclo[2.2.1]hept-2-en-5-yl)propionate,
butyl 5-(bicyclo[2.2.1]hept-2-en-5-yl)pentanoate,
ethyl 9-(bicyclo[2.2.1]hept-2-en-5-yl)nonanoate,
5-(3,4-epoxybutyl)bicyclo[2.2.1]hept-2-ene,
bicyclo[2.2.1]hept-2-en-5-methyl glycidyl ether,
5,6-dichlorobicyclo[2.2.1]hept-2-ene,
5-chloro-6-cyanobicyclo[2.2.1]hept-2-ene,
5,6-dihydroxybicyclo[2.2.1]hept-2-ene,
5,6-dicyanobicyclo[2.2.1]hept-2-ene,
5-chloro-6-isocyanatobicyclo[2.2.1]hept-2-ene,
5,6-dicarboxybicyclo[2.2.1]hept-2-ene,
diethyl bicyclo[2.2.1]hept-2-ene-5,6-dicarboxylate,
diisopropyl bicyclo[2.2.1]hept-2-ene-5,6-dicarboxylate,
bicyclo[2.2.1]hept-2-ene-5,6-ylene diacetate,
bicyclo[2.2.1]hept-2-ene-5,6-ylene dibutyrate,
5,6-diaminobicyclo[2.2.1]hept-2-ene,
5-methylamino-6-aminobicyclo[2.2.1]hept-2-ene,
5-dimethylamino-6-aminobicyclo[2.2.1]hept-2-ene,
5-dimethylamino-6-methylaminobicyclo[2.2.1]hept-2-ene,
5,6-di-(diethylamino)bicyclo[2.2.1]hept-2-ene,
bicyclo[2.2.1]hept-2-ene-5,6-dicarboxamide,
N-methylbicyclo[2.2.1]hept-2-ene-5,6-dicarboxamide,
N,N-dimethylbicyclo[2.2.1]hept-2-ene-5,6-dicarboxamide,
N,N'-dimethylbicyclo[2.2.1]hept-2-ene-5,6-dicarboxamide,
N,N,N'-trimethylbicyclo[2.2.1]hept-2-ene-5,6-dicarboxamide,
N,N,N',N'-tetramethylbicyclo[2.2.1]hept-2-ene-5,6-dicarboxamide,
N-butylbicyclo[2.2.1]hept-2-ene-5,6-dicarboxamide,
5,6-bis(epoxyethyl)bicyclo[2.2.1]hept-2-ene,
5,6-di(chloroethyl)bicyclo[2.2.1]hept-2-ene,
5,6-di-(bromobutyl)bicyclo[2.2.1]hept-2-ene,
5,6-di-(chlorononyl)bicyclo[2.2.1]hept-2-ene,
5,6-di-(hydroxypropyl)bicyclo[2.2.1]hept-2-ene,
5,6-di-(cyanomethyl)bicyclo[2.2.1]hept-2-ene,
5,6-di(cyanooctyl)bicyclo[2.2.1]hept-2-ene, 5,6-di-(isocyanatopropyl)bicyclo[2.2.1]hept-2-ene,
5,6-di-(isocyanatohexyl)bicyclo[2.2.1]hept-2-ene,
5,6-di-(aminomethylbicyclo[2.2.1]hept-2-ene,
5,6-di-(aminopentyl)bicyclo[2.2.1]hept-2-ene,
5-methylaminopropyl-6-aminopropylbicyclo[2.2.1]hept-2-ene,
5-diethylaminomethyl-6-aminoethylbicyclo[2.2.1]hept-2-ene,
5-diethylaminomethyl-6-ethylaminoethylbicyclo[2.2.1]hept-2-ene,
5,6-di(diethylaminoethyl)bicyclo[2.2.1]hept-2-ene,
5,6-di(acetoxymethyl)bicyclo[2.2.1]hept-2-ene,
5,6-di(octanoyloxypropyl)bicyclo[2.2.1]hept-2-ene,
5,6-di(chloroformylmethyl)bicyclo[2.2.1]hept-2-ene,
5,6-di(chloroformylbutyl)bicyclo[2.2.1]hept-2-ene,
5,6-di(carbamyloxymethyl)bicyclo[2.2.1]hept-2-ene,
5,6-di(carbamyloxypropyl)bicyclo[2.2.1]hept-2-ene,
5,6-di(carbamylethyl)bicyclo[2.2.1]hept-2-ene,
5,6-di(carbamylpentyl)bicyclo[2.2.1]hept-2-ene,
5-N-methylcarbamylmethyl-6-carbamyloxymethylbicyclo-[2.2.1]hept-2-ene,
5-N,N-dimethylcarbamylethyl-6-carbamyloxyethylbicyclo-[2.2.1]hept-2-ene,
5,6-di-(N-methylcarbamylmethyl)bicyclo[2.2.1]hept-2-ene,
5,6-di-(N,N-diethylcarbamylmethyl)bicyclo[2.2.1]hept-2-ene,
5,6-di-(carboxymethylene)bicyclo[2.2.1]hept-2-ene,
5,6-di-(carboxyoctylene)bicyclo[2.2.1]hept-2-ene,
5,6-di-(carbomethoxymethylene)bicyclo[2.2.1]hept-2-ene,
5,6-di-(carbomethoxybutylene)bicyclo[2.2.1]hept-2-ene,
5,6-di-(carbopentoxypropylene)bicyclo[2.2.1]hept-2-ene,
5,6-di-(2,3-epoxypropyl)bicyclo[2.2.1]hept-2-ene,
5,6-di-(3,4-epoxybutyl)bicyclo[2.2.1]hept-2-ene,
bicyclo[2.2.1]hept-2-en-5,6-dimethyl diglycidyl ether,
bicyclo[2.2.1]hept-2-en-5,6-dibutyl diglycidyl ether,
bicyclo[2.2.1]hept-2-en-5,6-dicarboxylic anhydride,
bicyclo[2.2.1]hept-2-en-5,6-dicarboximide,
N-(2-cyanoethyl)bicyclo[2.2.1]hept-2-en-5,6-dicarboximide,
N-(2-cyanoisopropyl)bicyclo[2.2.1]hept-2-en-5,6-dicarboximide,
N-(4-cyanobutyl)bicyclo[2.2.1]hept-2-en-5,6-dicarboximide,
N-(2-hydroxyethyl)bicyclo[2.2.1]hept-2-en-5,6-dicarboximide,
N-hydroxymethylbicyclo[2.2.1]hept-2-en-5,6-dicarboximide,
N-(5-hydroxypentyl)bicyclo[2.2.1]hept-2-en-5,6-dicarboximide,
N-(2-aminoethyl)bicyclo[2.2.1]hept-2-en-5,6-dicarboximide,
N-(4-aminobutyl)bicyclo[2.2.1]hept-2-en-5,6-dicarboximide,
N-(N'-methylaminoethyl)bicyclo[2.2.1]hept-2-en-5,6-dicarboximide,
N-chloromethylbicyclo[2.2.1]hept-2-en-5,6-dicarboximide,
N-(3-chloropropyl)bicyclo[2.2.1]hept-2-en-5,6-dicarboximide,
N-(2-bromoethyl)bicyclo[2.2,1]hept-2-en-5,6-dicarboximide,
N-(5-chloropentyl)bicyclo[2.2.1]hept-2-en-5,6-dicarboximide,
ethyl 3-phenylbicyclo[2.2.1]hept-2-en-5-carboxylate,
3-phenylbicyclo[2.2.1]hept-2-en-5-carboxamide,
phenyl bicyclo[2.2.1]hept-2-en-5-yl carbonate,
ethyl bicyclo[2.2.1]hept-2-en-5-yl carbonate,
N-butyl N'-bicyclo[2.2.1]hept-2-en-5-yl urea,
bicyclo[2.2.1]hept-2-en-5-yl ethyl ether,
bicyclo[2.2.1]hept-2-en-5-yl ethyl sulfide,
bicyclo[2.2.1]hept-2-en-5-yl ethyl sulfone,
bicyclo[2.2.1]hept-2-en-5-yl ethyl sulfoxide,
1-(bicyclo[2.2.1]hept-2-en-5-yl)-1,3-propanediol,
1-(bicyclo[2.2.1]hept-2-en-5-yl)propylene carbonate,
bicyclo[2.2.1]hept-2-en-5-ylmethyl cyclopentyl ether,
bicyclo[2.2.1]hept-2-en-5-ylmethyl cyclohexyl ether,
1,1-dioxotetrahydrothien-3-yl bicyclo[2.2.1]hept-2-en-5-ylmethyl ether,
5,6-bicyclo[2.2.1]hept-2-enylene carbonate,
5,6-bicyclo[2.2.1]hept-2-enylene carbamate,
5,6-bicyclo[2.2.1]hept-2-enylene sulfite,
4-oxatricyclo[5.2.1.0$^{2,6}$]dec-8-ene,
4-thiatricyclo[5.2.1.0$^{2,6}$]dec-8-ene,
4,7-methanohexahydrobenzo[c]thiophene oxide,
5,6-trimethylenebicyclo[2.2.1]hept-2-ene,
5,6-(1',3'-cyclopenta-4'-enylene)bicyclo[2.2.1]hept-2-ene,
5,6-(1',3'-cyclopentanylene)bicyclo[2.2.1]hept-2-ene,
5,6-(1',2',2',3',4',5'-hexachlorocyclopent-4'-enylene-1',3') bicyclo[2.2.1]hept-2-ene (Aldrin)
and the like.

These substituted bicyclo[2.2.1]hept-2-enes can be produced, for example, from cyclopentadiene or dicyclopentadiene and an alkene of the formula:

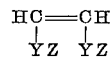

by the procedures generally set forth in "Organic Reactions," volumes IV and V and U.S. Patent No. 2,340,908. If the proper dienophile is not readily available for the synthesis of a given bicyclo[2.2.1]heptene, cyclopentadiene may be reacted with a simpler dienophile and further chemical transformation may then be carried out on the resulting Diels-Alder adduct. For example, the adduct of cyclopentadiene and allylamine may be converted to the hydrochloride and treated with phosgene to yield the corresponding isocyanate. The isocyanate may the be reacted with other active-hydrogen compounds such as alcohols or amines to yield ureas or carbamates, that is, dimethylaminoethanol to yield 2-dimethylaminoethyl bicyclo[2.2.1]hept-2-en-5-ylmethylcarbamate and the like.

Other examples include the preparation of the cyclic sulfite of bicyclo[2.2.1]hept-2-en-5,6-diol via known procedures from the diol; dehydration of the cyclopentadiene/2-butene-1,4-diol adduct to yield the corresponding ether; selective oxidation of bicyclo[2.2.1]hept-2-en-5-yl ethyl sulfide to the sulfoxide; conversion of 5,6- and 5,7-dihydroxybicyclo[2.2.1]hept-2-enes to cyclic carbonates with phosgene and base; and conversion of monohydroxy derivatives to the corresponding chloroformates, carbonates, and carbamates with phosgene, other alcohols, base and ammonia or amines via known methods. Thus, by known methods the compounds may be made by the addition of bicyclo[2.2.1]hept-2-en-5-ylmethanol to 2,5-dihydro-1,1-dioxothiophene.

The remarkable stability of the N-unsubstituted carboxamide copolymers of this invention is attained when there is at least about 0.1 weight percent amide nitrogen in the polymer chain. The amide nitrogen content can be about 2 weight percent or higher, if desired, but no particular advantage is gained by the presence of such amounts. Polymers having an amide nitrogen of from about 0.2 to about 0.8 weight percent are preferred.

It is not necessary to employ a bicycloheptene carboxamide, however, and any polymerizable N-unsubstituted hydrocarbyl amide can be employed. Suitable amides can be represented by the formula:

wherein G is a monovalent, mono-olefinically unsaturated hydrocarbon radical of from 2 to about 15 carbon atoms, such as an alkenyl radical or a cycloalkenyl radical. As examples of suitable amides one can mention acrylamide, methacrylamide, ethacrylamide, cyclohexenylcarboxamide, vinylbenzamide, bicyclo[2.2.1]hept-2-en-5-ylcarboxamide, 5-(bicyclo[2.2.1]hept-2-en - 5 - yl)hexylcarboxamide and the like. By the term "hydrocarbyl," as employed in the specification and claims, is meant a monovalent hydrocarbon radical.

The vinyl fluoride/bicyclo[2.2.1]hept-2-ene copolymers and the vinyl fluoride/amide copolymers are readily produced by conventional polymerization techniques, as by a free-radical catalyzed process employing solvent, bulk, suspension or emulsion processes, either batchwise or continuously.

The polymerization is generally conducted at elevated temperatures and temperatures of from about 25° C. to about 250° C. have been found suitable. However, it is preferred to employ temperatures of from about 150° C. to about 175° C.

Because vinyl fluoride is a gas which is insoluble in known reaction media, the polymerization must be conducted at pressures in excess of atmospheric. In general, pressures of from autogenous pressure, generally about 400 to 500 p.s.i., up to about 50,000 p.s.i.g. or higher can be employed. It is preferred, however, to employ pressures in the range of about 8000 p.s.i.g. to about 25,000 p.s.i.g.

The catalysts which are employed in the production of the copolymers of this invention are the free-radical cataylsts, which are employed in amounts sufficient to catalyze the copolymerization, generally from about 1 p.p.m. to about 10,000 p.p.m. or higher, based on the total weight of polymerizable monomers, with amounts of from about 2 p.p.m. to about 200 p.p.m. being preferred. Illustrative of suitable free-radical catalysts are the azo compounds, such as those disclosed in U.S. Patent No. 2,471,959, and the peroxides, including hydrogen peroxide, lauroyl peroxide, acetyl peroxide, tert.-butyl hydroperoxide, di-tert.-butyl peroxide, acetyl benzoyl peroxide, urea peroxide, tetralin hydroperoxide and the like; the alkali metal and ammonium persulfates, perborates and percarbonates, diisopropylperoxydicarbonate and the like, etc.

Reaction media, such as solvents for the catalyst and the bicycloheptene monomer, are preferably employed. As examples of suitable reaction media one can mention liquid hydrocarbons such as isooctane, isononane, cyclohexane, benzene and the like.

The copolymers of this invention can be recovered from the reaction mixture by methods known to those skilled in the art.

The vinyl fluoride copolymers of this invention can contain other polymerized monomers in addition to bicycloheptenes or amides. As examples of suitable additional monomers one can mention the vinyl and vinylidene halides such as vinyl chloride, vinylidene chloride, vinylidene bromide and the like; vinyl esters such as vinyl formate, vinyl acetate, vinyl propionate, vinyl butyrate, vinyl chloroacetate, vinyl chloropropionate, and the like; acrylic and alpha-alkyl acrylic acids and their nitriles such as acrylic acid, chloroacrylic acid, methacrylic acid, ethacrylic acid, methyl acrylate, ethyl acrylate, butyl arylate, n-otyl acrylate, 2-ethylhexyl acrylate, n-decyl acrylate, methyl methacrylate, butyl methacrylate, methyl ethacrylate, ethyl ethacrylate, N-methyl acrylamide, N,N-dimethyl acrylamide, N-methyl methacrylamide, N,N-dimethyl methacrylamide, acrylonitrile, chloroacrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinyl carbazole, N-vinyl pyrrolidone, ethyl methylene malonate; polymerizable cycloolefins such as bicyclo [2.2.2]oct-2-ene, their 5-substituted compounds and the like, bicyclo[2.2.1]hepta-2,5-diene, bicyclo[2.2.2] octa-2,5-diene, et cetera.

The following examples are illustrative. In these examples the following tests were employed in evaluating the copolymers produced thereby:

(1) Melt index—ASTM D1238—52T at 190° C. and 43.1 p.s.i.g.
(2) Flow rate—ASTM D1238–52T at 190° C. and 206 p.s.i.g.
(3) Density—ASTM 1505–57
(4) Stiffness modules—ASTM D638–56T
(5) Tensile strength—ASTM D638–56T
(6) Percent elongation—ASTM D638–56T
(7) Reduced viscosity—Determined at 140° C. from a solution of 0.2 gram of copolymer in 100 milliliters of cyclohexanone according to the equation $$I_R = \frac{I - I_Q}{I_0 C}$$

wherein $I_R$ = reduced viscosity
$I$ = viscosity of the solution
$I_o$ = viscosity of cyclohexanone
$C$ = concentration of the polymer in the solution in grams/100 ml. and is 0.2 gram/100 ml.

*Example 1*

A 2-liter, stainless steel, stirrer-equipped autoclave was charged with 50 millilters of oxygen-free isooctane, 5 grams of bicyclo[2.2.1]hept-2-ene, and 4 grams of di-isopropylperoxydicarbonate. The autoclave was then sealed, cooled to −80° C. and 500 grams of gaseous vinyl fluoride were added. The autoclave was heated to about 25° C. and was maintained at 25±5° C. for 18 hours. The vinyl fluoride pressure during the reaction was about 400–450 p.s.i.g. The unreacted vinyl fluoride was vented to the atmosphere and the autoclave contents were admixed with isopropanol, whereupon a vinyl fluoride/bicyclo[2.2.1]hept-2-ene copolymer precipitated. After washing the polymer and drying, there were obtained 243 grams of a white vinyl fluoride/bicyclo [2.2.1] hept-2-ene copolymer having a reduced viscosity of 0.75. Employing a portion of this copolymer, a clear, brittle plaque was molded at 195–200° C. with very little decomposition. Poly (vinyl fluoride) produced in a similar manner decomposes under these conditions.

*Examples 2–7*

A 1.5-liter, stainless steel, stirrer-equipped autoclave was charged with 475 grams of benzene, 35 grams of bicyclo[2.2.1]hept-2-ene and 2.5 millliters of a 5 weight percent solution of di-tert-butyl peroxide in benzene. The autoclave was flushed twice with nitrogen and then once with vinyl fluoride by pressuring the autoclave to 50 p.s.i.g. and then slowly venting to the atmosphere. The autoclave was then sealed and pressured to 1000 p.s.i.g. with vinyl fluoride. Agitation of the mixture was begun, the autoclave was heated to 157° C., and the vinyl fluoride pressure was increased to about 15,000 p.s.i.g. The reaction was continued at 14,000–15,000 p.s.i.g. and 157–161° C. for 2 hours and 24 minutes. At the end of this time, the autoclave was cooled to 50° C. and unreacted vinyl fluoride was vented. The reaction product was admixed with methanol to precipitate the vinyl fluoride/bicyclo[2.2.1]hept-2-ene copolymer produced. After washing twice with methanol and oven-drying overnight at 50° C. the white, powdery copolymer weighed 125 grams. The copolymer had a melt index of 0.82 dgm./min., flow rate of 8.52 dgm./min., a stiffness modulus of 149,885 p.s.i., a tensile strength of 3832 p.s.i. and an elongation of 432 percent. The copolymer was found to contain 87.2 weight percent polymerized vinyl fluoride by fluorine analysis. The copolymer had a density of 1.330 grams/cc. and a reduced viscosity of 0.73. The copolymer could be heated at 220–230° C. for 1 minute without significant discoloration, whereas poly(vinyl fluoride) starts to decompose at about 200° C. after 1 minute. There was no apparent deterioration of a plaque of the copolymer after over 700 hours exposure to ultra-violet light.

Employing apparatus and procedures similar to those described above, five additional vinyl fluoride/bicyclo-[2.2.1]hept-2-ene copolymers were produced. The data for these polymerizations are summarized in the following table with the data for the above experiment being included as Example 2.

| Example | 2 | 3 | 4 | 5 | 6 | 7 |
|---|---|---|---|---|---|---|
| Charge: | | | | | | |
| Bicyclo[2.2.1]-hept-2-ene, grams | 35 | 6 | 12 | 8 | 59 | 112 |
| Benzene, grams | 475 | 475 | 475 | 475 | 475 | 475 |
| Di-tert.-butyl peroxide solution, ml | 2.5 | 2.5 | 2.5 | 2.5 | 2.6 | 2.75 |
| Conditions: | | | | | | |
| Maximum Temperature, °C | 161 | 162 | 165 | 167 | 160 | 166 |
| Pressure, p.s.i.×10⁻³ | 15 | 15 | 15 | 15 | 15 | 15 |
| Time, hours | 2.4 | 4.0 | 2.4 | 1.8 | 2.3 | 4.0 |
| Product: | | | | | | |
| Weight, grams | 125 | 137.5 | 163 | 155 | 137 | 111 |
| Reduced viscosity | 0.73 | 1.21 | 1.26 | 0.78 | 0.48 | |
| Melt Index, dgm./min. | 0.828 | 0 | 0 | 0 | 0.21 | 14.7 |
| Flow Rate, dgm./min. | 8.52 | 0.107 | 0.021 | 0 | 0.46 | 88 |
| Stiffness, p.s.i.×10⁻⁴ | 15.0 | 11.7 | 12.4 | 13.7 | 15.6 | 14.7 |
| Tensile, p.s.i.×10⁻³ | 3.8 | 4.2 | 4.4 | 4.1 | 4.5 | 3.5 |
| Elongation, percent | 432 | 56 | 307 | 112.5 | 114 | 8 |
| Yield Stress, p.s.i.×10⁻³ | 5.2 | 5.0 | 4.5 | 5.2 | 4.9 | |
| Melting Temperature, °C | 160 | 192 | 194 | 183 | 151 | |
| Composition: | | | | | | |
| Vinyl fluoride, wt. percent | 87.2 | 93.4 | 91.6 | 89.8 | 80.2 | 70.7 |
| Bicyclo[2.2.1]hept-2-ene, wt. percent | 12.8 | 6.6 | 8.4 | 10.2 | 19.8 | 29.3 |

Example 8

Employing apparatus and procedures similar to those described in Example 2, 475 grams of benzene, 3.0 milliliters of a 5 weight percent solution of di-tert.-butylperoxide in benzene, and 24 grams of 1,2,3,4,10,10-hexachloro-1,4,4a,5,8,8a-hexahydro-1,4,5,8-dimethanonaphthalene (Aldrin) were charged to the autoclave. The polymerization was conducted for 3.4 hours at a pressure of 15,000 p.s.i.g. and a maximum temperature of 163° C. There were recovered 111 grams of a vinyl fluoride/Aldrin copolymer which contained 5.74 weight percent (0.76 mole percent) Aldrin as determined by analysis for chlorine. The copolymer was molded to form a tan, clear, tough plaque. The physical properties of the copolymer are:

Melt index, dgm./min. _____ 0.215
Flow rate, dgm./min. _____ 2.28
Density, gm./cc. _____ 0.338
Stiffness, p.s.i. _____ 176,297
Tensile strength, p.s.i. _____ 3,519
Softening temperature, °C. _____ 60
Melting temperature, °C. _____ 194

Example 9

Employing apparatus and procedures similar to those described in Example 8, except that 32 grams of 5,5 dimethylbicyclo[2.2.1]hept-2-ene were substituted for the Aldrin, 100 grams of a vinyl fluoride/5,5-dimethylbicyclo-[2.2.1]hept-2-ene copolymer were produced. The copolymer was found by analysis for fluorine to contain 94.6 weight percent (98.9 mole percent) polymerized vinyl fluoride. The copolymer was molded to form a light yellow, clear, tough plaque. The physical properties of the copolymer are:

Melt index, dgm./min. _____ 0
Flow rate, dgm./min. _____ 0
Density, gm./cc. _____ 1,293
Stiffness, p.s.i. _____ 139,331
Tensile strength, p.s.i. _____ 4,219
Elongation, percent _____ 121
Softening temperature, °C. _____ 60
Melting temperature, °C. _____ 184

Example 10

A 2-liter, stainless steel, stirrer-equipped autoclave was charged with 30 milliliters of isooctane, 4 grams of diisoproproplyperoxydicarbonate, 9 grams of bicyclo [2.2.1]hept-2-ene and 1 gram of 5-aminomethylbicyclo [2.2.1]hept-2-ene. The autoclave was sealed and charged with 525 grams of vinyl fluoride. The mixture was heated to 30° C. and maintained at that temperature for 65 hours. Unreacted vinyl fluoride was vented off and the reaction mixture was admixed with isopropanol to precipitate the vinyl fluoride/bicyclo[2.2.1]hept-2-ene/5-aminomethyl-bicyclo[2.2.1]hept-2-ene copolymer thus produced. After filtering from the isopropanol, washing and drying, the terpolymer weighed 34.5 grams and contained 0.15 weight percent nitrogen. The terpolymer had a reduced viscosity of 0.15.

Examples 11–13

A 1480-milliliter, stirrer-equipped autoclave was charged with 464 grams of benzene, 37 grams of a 70 weight percent solution of bicyclo[2.2.1]hept-2-ene in benzene, 10 grams of bicyclo[2.2.1]hept-2-ene-5-carboxamide, and 4 milliliters of a 1 weight percent solution of di-tert.-butyl peroxide in benzene. The autoclave was sealed and flushed twice with nitrogen and then once with vinyl fluoride by pressuring to 50 p.s.i. and venting to atmospheric pressure. Vinyl fluoride was admitted to the autoclave to a pressure of 1000 p.s.i., the autoclave was heated to 160° C. and the vinyl fluoride pressure was raised to 15,000 p.s.i.g. After 4 hours and 25 minutes at 15,000 p.s.i.g., and 160° C., the autoclave was cooled to below 50° C. and unreacted vinyl fluoride was vented. After filtration from the reaction mixture and drying there was recovered a tough grey vinyl fluoride/bicyclo[2.2.1]hept-2-ene/bicyclo[2.2.1]hept-2-ene-5-carboxamide terpolymer which was found to contain 0.29 weight percent nitrogen and 38.6 weight percent fluorine, corresponding to a terpolymer composition of 93.5 weight percent polymerized vinyl fluoride, 3.6 weight percent bicyclo[2.2.1]hept-2-ene and 2.9 weight percent polymerized bicyclo[2.2.1]hept-2-ene-5-carboxamide.

Employing similar procedures, two additional vinyl fluoride/bicyclo[2.2.1]hept-2-ene/bicyclo[2.2.1]hept-2-en-5-yl carboxamide terpolymers were produced. The data for these polymerizations and the resulting products are tabulated below, with the foregoing data being included as Example 11.

| Example | 11 | 12 | 13 |
|---|---|---|---|
| Charge: | | | |
| Benzene, grams | 475 | 475 | 475 |
| Bicyclo[2.2.1]-hept-2-ene, grams | 21 | 31 | 34 |
| Bicyclo[2.2.1]-hept-2-en-5-yl, carboxamide, grams | 10 | 5.0 | 2 |
| Di-tert.-butyl peroxide solution, milliliters | 4 | 4 | 4 |
| Conditions: | | | |
| Pressure, p.s.i. | 15,000 | 15,000 | 15,000 |
| Temperature, °C | 160 | 160 | 160 |
| Time, hours | 4.4 | 2.2 | 4.4 |
| Product: | | | |
| Fluorine, wt. percent | 38.6 | 36.5 | 38.1 |
| Nitrogen, wt. percent | 0.29 | 0.30 | 0.13 |
| Vinyl fluoride, wt. percent | 93.5 | 88.4 | 92.3 |
| Bicyclo[2.2.1]hept-2-ene, wt. percent | 3.6 | 8.6 | 6.4 |
| Bicyclo[2.2.1]hept-2-en-5-yl, carboxamide, wt. percent | 2.9 | 3.0 | 1.3 |

Example 14

A 2-liter, stainless steel, stirrer-equipped autoclave was charged with 10 milliliters of isooctane, 4 grams of acrylamide and 4 grams of diisopropylperoxydicarbonate. The autoclave was cooled to −80° C., purged with nitrogen, then with vinyl fluoride and, after sealing, was charged with 500 grams of vinyl fluoride. The autoclave was then heated to 30° C. and maintained at that temperature for 17 hours. The unreacted vinyl fluoride was vented and the reaction mixture was slurried in isopropanol.

After filtering from the slurry, washing with isopropanol and drying, the vinyl fluoride/acrylamide polymer thus produced weighed 169.2 grams and had a reduced viscosity of 1.43, as determined at 139° C. from a solution of 0.2 gram of the copolymer in 100 milliliters of cyclohexanone. The copolymer was found to contain 0.30 weight percent nitrogen in the form of polymerized acrylamide.

A portion of the polymer was molded at 275° C. for 30 seconds to form a slightly-yellow, clear plaque. A second plaque, molded at 250° C. for 1 minute, showed virtually no discoloration.

Unstabilized poly(vinyl fluoride) becomes very brittle and blackens at temperatures of about 200° C. to 240° C. and cannot be subjected to temperatures of 275° C. without violent decomposition.

*Example 15*

Employing apparatus and procedures similar to those described in Example 14, 10 milliliters of isooctane, 4 grams of bicyclo[2.2.1]hept-2-ene, 4 grams of acrylamide, 4 grams of diisopropylperoxydicarbonate and 475 grams of vinyl fluoride were heated at 30° C. for 17 hours. There were produced 142 grams of a vinyl fluoride/bicyclo[2.2.1]hept-2-ene/acrylyamide copolymer having a reduced viscosity of 0.92 and containing 0.69 weight percent nitrogen. This terpolymer could be heated at 275° C. for 30 seconds with no discoloration.

*Example 16*

Employing apparatus and procedures similar to those described in Example 14, 10 milliliters of isooctane, 8 grams of bicyclo[2.2.1]hept-2-ene, 4 grams of diisopropylperoxydicarbonate, 2.5 grams of acrylamide and 550 grams of vinyl fluoride were heated at 32° C. for 17 hours. There were recovered 89 grams of a vinyl fluoride/bicyclo[2.2.1]hept-2-ene/acrylamide terpolymer having a reduced viscosity of 0.57 and containing 0.16 weight percent nitrogen. This terpolymer could be heated to 275° C. for 30 seconds without discoloration.

*Example 17*

Employing apparatus and procedures similar to those described in Example 14, except that bicyclo[2.2.1]hept-2-en-5-yl carboxamide, is substituted for acrylamide, a thermally stable vinyl fluoride/bicyclo[2.2.1]hept-2-en-5-yl carboxamide copolymer is produced.

*Example 18*

Employing apparatus and procedures similar to those described in Example 11, a terpolymer of vinyl fluoride, bicyclo[2.2.1]hept-2-ene, and acrylamide was produced which contained 0.13 weight percent polymerized amide nitrogen and 38 weight percent fluorine, corresponding to 92.2 weight percent polymerized vinyl fluoride; 7.1 weight percent polymerized bicyclo[2.2.1]hept-2-ene, and 0.7 weight percent polymerized acrylamide. A sample of this terpolymer, as well as samples of each of the terpolymers of Examples 11–13, was molded at 275° C. and 100 p.s.i. for 1 minute. All of the polymers possessed excellent thermal stability, as indicated by the lack of discoloration of the terpolymers after this treatment. A 108-gram sample of a mixture of vinyl fluoride/bicyclo[2.2.1]hept-2-ene copolymers containing an average of 10 weight percent bicyclo[2.2.1]heptene was suspended in a solution of 0.86 milliliter of dicyclohexylamine in 740 milliliters of methanol. The mixture was thoroughly stirred and the vinyl fluoride/bicyclo[2.2.1]hept-2-ene copolymer, containing adsorbed dicyclohexylamine, was filtered from the mixture and dried. The polymer, when molded at 275° C. and 100 p.s.i. for 1 minute, decomposed badly, evolving hydrogen fluoride and leaving a charred residue.

What in claimed is:

1. A shapeable solid copolymer of (a) vinyl fluoride and (b) at least one bicyclo[2.2.1]hept-2-ene compound having no substitutents on the carbon atoms forming the double bond and having a molecular weight of less than 400; said copolymer containing from 55 to 99.5 mole percent polymerized vinyl fluoride, the balance being polymerized bicyclo[2.2.1]hept-2-ene compound.

2. A shapeable solid copolymer of (a) vinyl fluoride and (b) at least one bicyclo[2.2.1]hept-2-ene compound having no substitutents on the carbon atoms forming the double bond and having a molecular weight of less than 400; said copolymer containing from 85 to 95 mole percent polymerized vinyl fluoride, the balance being polymerized bicyclo[2.2.1]hept-2-ene compound.

3. The shapeable solid copolymer as claimed in claim 2 wherein said bicyclo[2.2.1]hept-2-ene compound is bicyclo[2.2.1]hept-2-ene.

4. The shapeable solid copolymer as claimed in claim 2 wherein said bicyclo[2.2.1]hept-2-ene compound is 5,5-dimethylbicyclo[2.2.1]hept-2-ene.

5. The shapeable solid copolymer as claimed in claim 2 wherein said bicyclo[2.2.1]hept-2-ene compound is bicyclo[2.2.1]hept-2-en-5-ylcarboxamide.

6. A shapeable solid terpolymer containing from 55 to 99.5 mole percent polymerized vinyl fluoride, the balance being polymerized bicyclo[2.2.1]hept-2-en-5-ylcarboxamide and polymerized bicyclo[2.2.1]hept-2-ene.

7. A shapeable solid terpolymer containing from 85 to 95 mole percent polymerized vinyl fluoride, the balance being polymerized bicyclo[2.2.1]hept-2-en-5-ylcarboxamide and polymerized bicyclo[2.2.1]hept-2-ene.

8. A thermally stable vinyl fluoride shapeable solid polymer containing polymerized vinyl fluoride and a polymerized N-unsubstituted carboxamide, said polymer containing from 0.1 to 2.0 weight percent nitrogen in the form of an N-unsubstituted carboxamide group in the polymer chain.

9. A thermally stable vinyl fluoride shapeable solid polymer containing polymerized vinyl fluoride and a polymerized mono-olefinically unsaturated hydrocarbyl N-unsubstituted carboxamide having from 2 to 15 carbon atoms in the hydrocarbyl group thereof, said copolymer containing from 0.1 to 2.0 weight percent nitrogen in the form of an N-unsubstituted carboxamide group in the polymer chain.

10. A thermally stable vinyl fluoride shapeable solid polymer containing polymerized vinyl fluoride and a polymerized mono-olefinically unsaturated hydrocarbyl N-unsubstituted carboxamide having from 2 to 15 carbon atoms in the hydrocarbyl group thereof, said copolymer containing from 0.2 to 0.8 weight percent nitrogen in the form of an N-unsubstituted carboxamide group in the polymer chain.

11. A thermally stable vinyl fluoride shapeable solid polymer containing polymerized vinyl fluoride and polymerized acrylamide, said polymer containing from 0.2 to 0.8 weight percent nitrogen in the form of polymerized acrylamide.

12. A thermally stable vinyl fluoride shapeable solid polymer containing polymerized vinyl fluoride and polymerized bicyclo[2.2.1]hept-2-en-5-yl carboxamide, said polymer containing from 0.2 to 0.8 weight percent nitrogen in the form of polymerized bicyclo[2.2.1]hept-2-en-5-yl carboxamide.

No cited references.

JOSEPH L. SCHOFER, *Primary Examiner.*